(12) United States Patent
Wake

(10) Patent No.: US 7,040,217 B1
(45) Date of Patent: May 9, 2006

(54) TIE ROD FOR A BRAKE BOOSTER

(75) Inventor: Masato Wake, South Bend, IN (US)

(73) Assignee: Robert Bosch GmbH, Stuttgart (DE)

( * ) Notice: Subject to any disclaimer, the term of this patent is extended or adjusted under 35 U.S.C. 154(b) by 49 days.

(21) Appl. No.: 10/904,556

(22) Filed: Nov. 16, 2004

(51) Int. Cl.
F15B 9/10 (2006.01)

(52) U.S. Cl. .................. 92/169.2; 91/376 R

(58) Field of Classification Search ......... 92/169.2, 92/169.3, 169.4; 91/376 R, 369.1–369.4; 60/552, 554

See application file for complete search history.

(56) References Cited

U.S. PATENT DOCUMENTS

| | | | |
|---|---|---|---|
| 3,146,682 A | 9/1964 | Price et al. | |
| 4,267,766 A | 5/1981 | Hosting | |
| 4,270,438 A * | 6/1981 | Thomas et al. ............... | 91/49 |
| 4,339,921 A * | 7/1982 | Schanz ....................... | 60/547.1 |
| 4,377,069 A | 3/1983 | Kobayashi | |
| 4,594,854 A * | 6/1986 | Takeuchi et al. ............ | 60/547.1 |
| 4,630,525 A * | 12/1986 | Nishii ........................ | 91/369.2 |
| 4,783,964 A | 11/1988 | Fanelli et al. | |
| 4,790,235 A | 12/1988 | Gauiter et al. | |
| 4,944,214 A * | 7/1990 | Briggs ........................ | 92/98 R |
| 5,072,996 A | 12/1991 | Heibel et al. | |
| 5,447,030 A * | 9/1995 | Wang et al. ................. | 60/552 |
| 6,050,174 A * | 4/2000 | Schonlau et al. .......... | 92/169.3 |
| 6,189,437 B1 | 2/2001 | Morlan | |
| 6,755,117 B1 * | 6/2004 | Vermoesen et al. ........ | 92/169.2 |

* cited by examiner

Primary Examiner—Igor Kershteyn
(74) Attorney, Agent, or Firm—Leo H McCormick, Jr.; Warren Comstock; Sarah Taylor

(57) ABSTRACT

A first and second tie rods locating between a front shell and a rear shell of a brake booster through which a master cylinder is connected to a support member. Each of the first and second tie rods have a head that engages the rear shell and a first shaft that extends from the head in a first direction along a first axis through the front shell and the flange and a second shaft that extends from the head in a second direction offset from the first shaft along a second axis through the rear shell and the support member. Fasteners are secured to the first, second, third and fourth shafts such that the front shell and rear shell are compressed between the flange and support member and forces are transmitted into the support member without creating a moment that would change the axial alignment of the first and third shafts.

6 Claims, 2 Drawing Sheets

US 7,040,217 B1

TIE ROD FOR A BRAKE BOOSTER

This invention relates to a brake booster having first and second tie rods through which a master cylinder to secured to a support member wherein each tie rod has a first shaft that extends from a head along a first axis and a second shaft that extends from the head in a second axis that is offset from the first axis such that the second shaft may be rotated to match an attachment pattern of different support members.

BACKGROUND OF THE INVENTION

It is common practice for a housing of a brake booster to be manufactured from a front shell which is joined to a rear shell through some type of lancing operation such as disclosed in U.S. Pat. No. 4,267,766. In an effort to increase the output of brake boosters various methods have been devised to double the size of the housing while maintaining the same effective diameter such as disclosed in U.S. Pat. No. 3,146,682 for a tandem brake booster to produce an output force which is greater than a single brake booster. This type of tandem brake booster functions in an adequate manner but the increase in weight and may not be acceptable for some customer's applications. In an effort to reduce the weight of a brake booster it has been suggested that a lighter weight or gauge material could be used for the front and rear shells if the forces generated during braking could be directly transmitted from a master cylinder to a wall that separates the engine compartment from the passenger compartment. U.S. Pat. Nos. 4,377,069 and 5,072,996 discloses structure wherein bolts extend through the interior of a brake booster to connect a master cylinder with the wall of a vehicle. The movable wall of the brake booster sealed with respect to the bolts and slides on the bolts to create a desired braking force. The size of the bolts are selected to resist actuation forces applied to pressurize fluid in the master cylinder during a brake application. Thus, the bolts must be sized to have a sufficient size to carry a maximum actuation force as may be developed by movement of a wall under the influence of a maximum pressure differential that may be achieved in a brake booster. In addition, the bolts disclosed in U.S. Pat. No. 4,377,069 by must also have sufficient strength to assure that any bending moment introduced therein do not effect the smooth movement of the wall on a bolt. Further an increase in size of a bolt of this brake booster also requires a larger diameter seal to achieve sealing between the chambers during a brake application and as a result all of which adds to the overall cost of a brake booster.

SUMMARY OF THE INVENTION

An advantage this invention is achieved in providing a tie bar arrangement through which a master cylinder is attached to a fixed wall without effecting a smooth sliding surface on which a moveable wall moves to provide an operational force to pressurize fluid in the master cylinder.

The tie rod arrangement includes first and second tie rods that are locating between a front shell and a rear shell of a brake booster with each tie rod being defined by a head member that engages the rear shell with a tab that engages the rear shell to align a first shaft that extends there from in a first direction along a first axis through the front shell and a first opening in a flange on the master cylinder and a second shaft that extends from the head member in a second direction along a second axis through the rear shell that is offset from the first shaft and is aligned with an opening in the support member. Fasteners are attached to the first and second shafts to compress the front shell and rear shell between the flange and support member such that a resistive force to effect a brake application is communicated into the support member without distorting or introducing a bending moment into a tie rod that would affect the smooth sliding of a movable wall in the transmission of an actuation force to pressurize fluid in the master cylinder.

It is an object of this invention to provide first and second tie rods for attaching a master cylinder to a support member wherein each tie rod have a tab that engages a rear shell to align first and second shafts in parallel first and second axis such that a resistive force that oppose an actuation force is transmitted into the support member without the introduction of bending moments that would effect the transmission of an actuation force to pressurize fluid in the master cylinder in effecting a brake application.

DETAILED DESCRIPTION OF THE INVENTION

Figure 1:
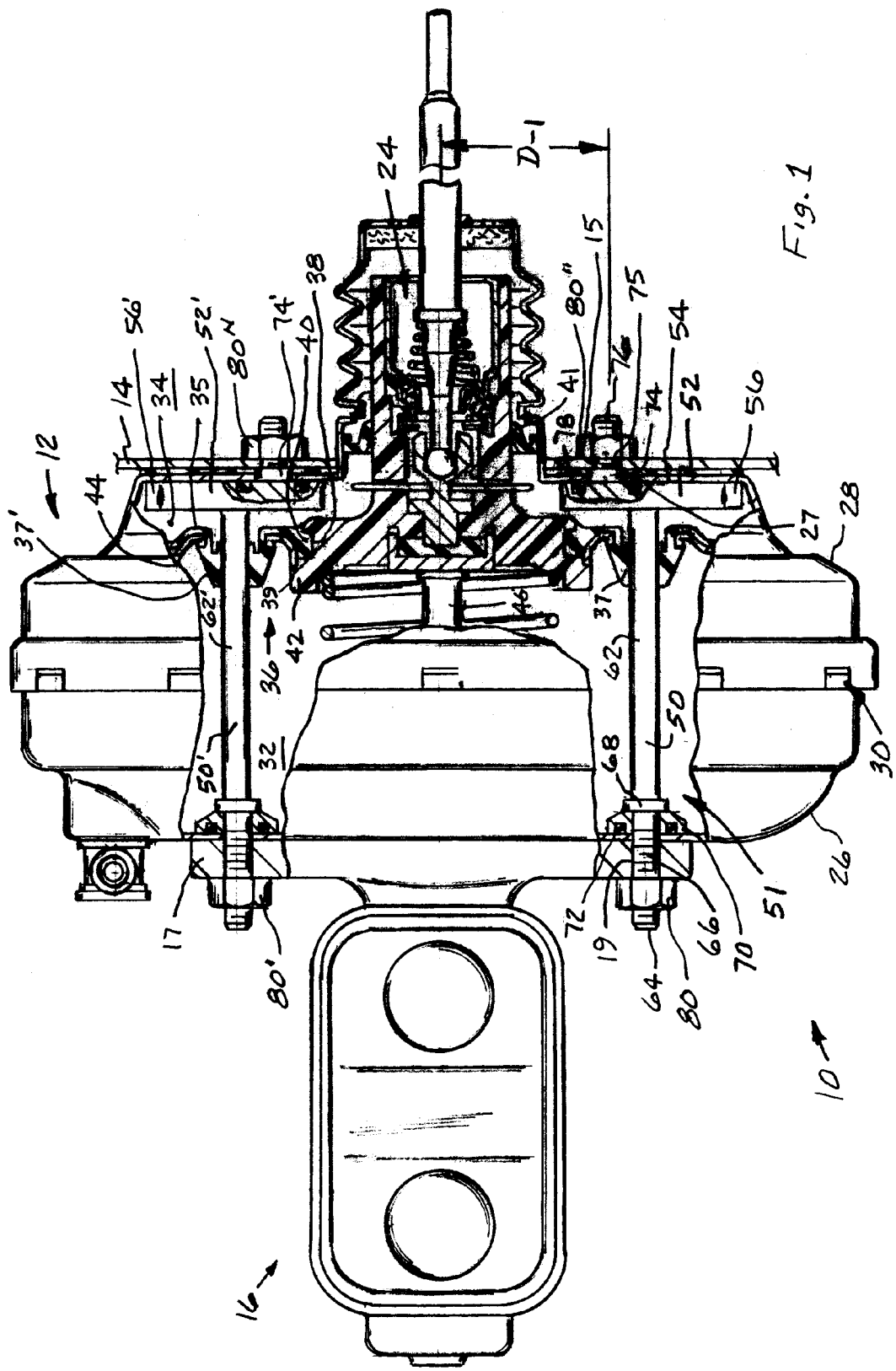
FIG. 1 is a schematic illustration of a brake booster wherein a master cylinder is connected through a tie rod arrangement located within the brake booster to a first support member according to the present invention.

Throughout this specification and in the drawings certain components that are identical may be identified by the same number with a added thereto.

A brake actuator 10 is schematically shown in FIG. 1 and includes a master cylinder 16 that is connected to a support member 14 through a tie rod arrangement 51 that is located in a vacuum brake booster 12 according to the present invention. The master cylinder 16 responds to an output force from booster 12 to pressurize fluid that is supplied to wheel brakes of the vehicle. The brake booster 12 receives an input from an operator through push rod 22 connected to a pedal to operate a control valve 24 and create a pressure differential across a wall 36 to develop the output force which pressurizes fluid through movement of pistons in the master cylinder 16 to effect a brake application.

In more particular detail, the brake booster 12 consists of a housing defined by a first shell 26 that is joined to a rear shell 28 through a lock arrangement 30. The interior of the housing is divided by a movable wall 36 into at least a front chamber 32 and a rear chamber 34. The movable wall 36 is attached to hub 42 and includes a backing plate 44 and diaphragm 35 with a first bead on diaphragm 35 retained by the lock arrangement 30 and a second bead 40 located on a groove 38 to hold the backing plate 44 against a shoulder 39 on the hub 42. The hub 42 has an axial bore 41 through which the front chamber 32 is connected to the rear chamber 34. A control valve 24 is located in axial bore 41 to control the communication of a vacuum available to the front chamber 32 and selectively supplied to the rear chamber 34 and air at atmospheric pressure from the surrounding environment to the rear chamber 34 that is selectively supplied to the rear chamber 34 to create a pressure differential across the movable wall 36. The pressure differential acts on the movable wall 36 to develop an output force that is carried into the hub 42. The output force moves the movable wall 36 toward the front shell 26 and push rod 46 acts on pistons in the master cylinder 16 to pressurize fluid therein to effect a brake application. The resistance to movement of the pistons in the master cylinder 16 to the output force is carried through flange 17 on the master cylinder 16 and the support member 14 but the tie rod arrangement 51 maintains a substantially stable structural relationship between the components of the brake system.

Figure 2:
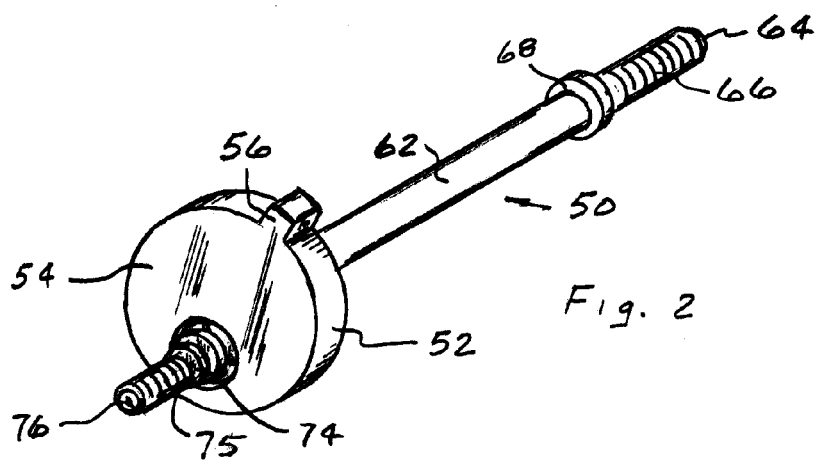
FIG. 2 is a perspective view of the tie rod of FIG. 1.
Figure 3:
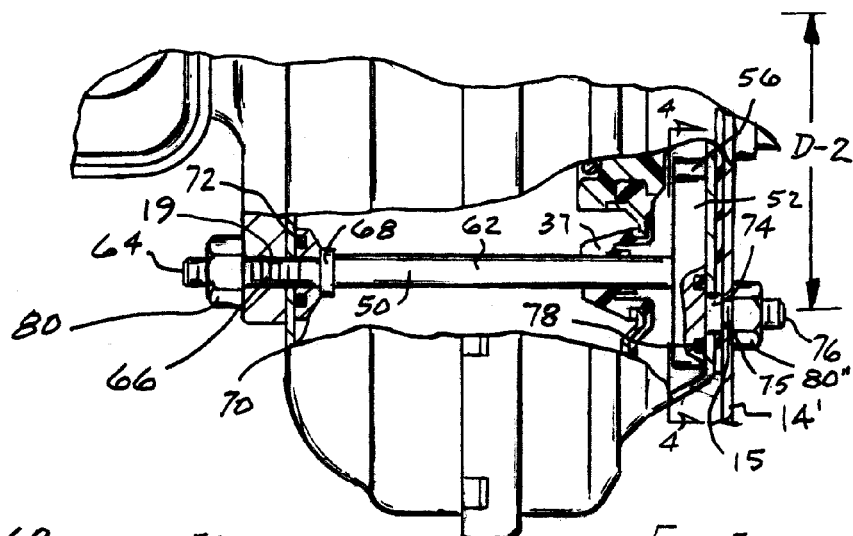
FIG. 3 is a schematic illustration of the tie rod of FIG. 1 and brake booster wherein a second support member has a different attachment patteren.
Figure 4:
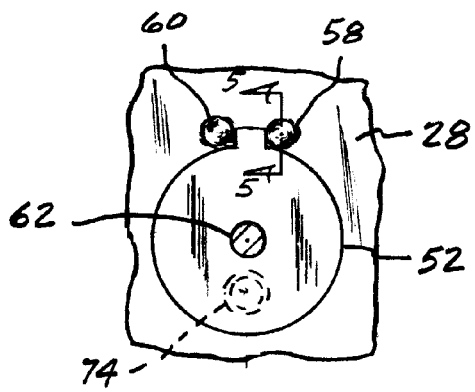
FIG. 4 is a sectional view taken along line 4—4 of FIG. 3.
Figure 5:
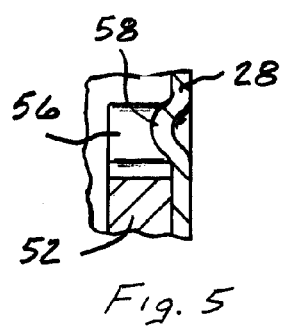
FIG. 5 is a sectional view taken along line 5—5 of FIG. 4.

In more particular detail, the tie rod arrangement 51 is locating between a front shell 26 and a rear shell 28 of a brake booster 12 and is characterized by a first tie rod 50 and a second tie rod 50'. Tie rods 50 and 50' are identical and as a result only tie rod 50 is herein described in detail. Tie rod 50, as best shown in FIG. 2, is defined by a head 52 with a first shaft 62 and a second shaft 74 that extend there from. Head 52 has a face 54 thereon that engages the rear shell 28 and a tab 56 that is located between first 58 and second 60 projections on the rear shell 28, see FIGS. 4 and 5 to align the first shaft 62 in a first direction along a first axis and the second shaft 74 in a second direction along a second axis that is parallel to the first axis and the axis of the hub 42. When aligned in the first axis, a threaded section 66 on the end 64 of the first shaft 62 extends through the front shell 26 and a first opening 19 in flange 17, as illustrated in FIGS. 1 and 3. The threaded section 66 extends from end 64 to a shoulder 68 and receives a washer 70 that is located adjacent a shoulder 68 on the first shaft 62. A first seal 72 is located between the washer 70 and the front shell 26 and engages the front shell 26 to seal chamber 32 from the surrounding environment. In a same manner a threaded section 75 on end 76 on the second shaft 74 extends from face 54 of the head 52 along the second axis through the rear shell 28 and an opening 15 in the support member 14. The second axis of the second shaft 74 is offset with respect to the first axis of the first shaft 62 such that the second shaft 74 is located a fixed distance from the axis of the hub 42 with the first shaft 62 is located a different fixed distance from the axis of the hub 42. A second seal 78 is located on the second shaft 74 between face 54 on head 52 and the rear shell 28 such that an opening 27 in the rear shell 28 and chamber 34 is sealed from the surrounding environment.

The location of the opening 27 in the rear shell 28 for a brake booster is different the support member 14 shown in FIG. 1 and the support member 14' shown in FIG. 3. In FIG. 1 tab 56 on head 52 is retained between projections 58 and 60 that are located a first distance D-1 from the axis 41 of hub 42 whereas in FIG. 3 tab 56 is rotated 180 degrees and retained between projections 58' and 60' that are located a second distance D-2 from the axis 41 of hub 42. Thus, a same tie rod 50, 50' may be used in either shell 28 or 28' to secure a master cylinder 16 to a support member.

Nuts 80, 80' . . . 80n are respectively attached to the threaded ends 66,66' on the first shaft 62,62' and to threaded ends 75,75' on the second shaft 74,74' to compress the first shell 26 and the second shell 28 between flange 17 and the support member 14 and thereby attach the master cylinder 16 to the support member 14.

During a brake application, an output force developed in response to a pressure differential created across the movable wall 36 is communicated into the hub 42 and transmitted through push rod 46 to move pistons in the master cylinder 16 and pressurize fluid therein to effect a brake application. The resistance to the pistons in the master cylinder 16 to the output force is carried through flange 17 on the master cylinder 16 into the tie rod arrangement 50 such that a force is created that pulls on the ends 64,64' of the first shafts 62,62' however the size of the heads 52,52' and the engagement of face 54,54' with the rear shell 28 derived through the attachment of nuts 80", 80n with threaded sections 74,74' holds the first shafts 62,62' in parallel axis with respect to the axis 41 of the hub 42 such that seals 37,37' on the movable wall 36 freely slides on the first shafts 62,62' during a brake application.

What is claimed is:

1. A tie rod arrangement locating between a front shell and a rear shell of a brake booster through which a flange on a housing of a master cylinder is connected to a support member, said tie rod arrangement being characterized by a first head that engages said rear shell with a first shaft that extends there from in a first direction along a first axis through said front shell and a first opening in said flange and a second shaft offset from said first shaft that extends from said first head in a second direction along a second axis through said rear shell and a first opening in said support member, such that said second shaft is located a fixed distance from a central axis of said brake booster and said first shaft is located a different fixed distance from said central axis of said brake booster and a second head that engages said rear shell with a third shaft that extends there from in said first direction along a third axis through said front shell and a second opening in said flange and a fourth shaft offset from said third shaft that extends from said second head in said second direction along a fourth axis through said rear shell and a second opening in said support member, and fastener means secured to said first shaft, second shaft, third shaft and fourth shaft such that said flange acts on said front shell to transmit a force through said first shaft that compresses said rear shell between said first head and second head and said support member while resisting said force.

2. The tie rod arrangement as recited in claim 1 wherein first head and second head are each characterized by an index tab that engages said rear shell to align said second and fourth shafts in a desired spatial alignment with respect to said support member.

3. The tie rod arrangement as recited in claim 2 wherein said index tabs may be rotated with respect to said first and third axis to achieve a different said desired spatial alignment of a support member.

4. The tie rod arrangement as recited in claim 3 wherein said first shaft and said third shaft are each characterized by a threaded section that extends from an end to a shoulder, said shoulder engaging said front shell to receive said force from said flange.

5. The tie rod arrangement as recited in claim 4 wherein said first shaft and said third shaft are each characterized by a washer and a seal member located between said shoulder and from shell to seal the interior of the front shell from the surrounding environment.

6. The tie rod arrangement as recited in claim 5 wherein said second shaft and fourth shaft receive a second seal to seal the rear shell from the surrounding environment.

* * * * *